Feb. 23, 1943.  H. S. LEE  2,311,843
METHOD AND APPARATUS FOR HANDLING AND DISPENSING FOOD PRODUCTS
Filed May 4, 1940  5 Sheets-Sheet 1
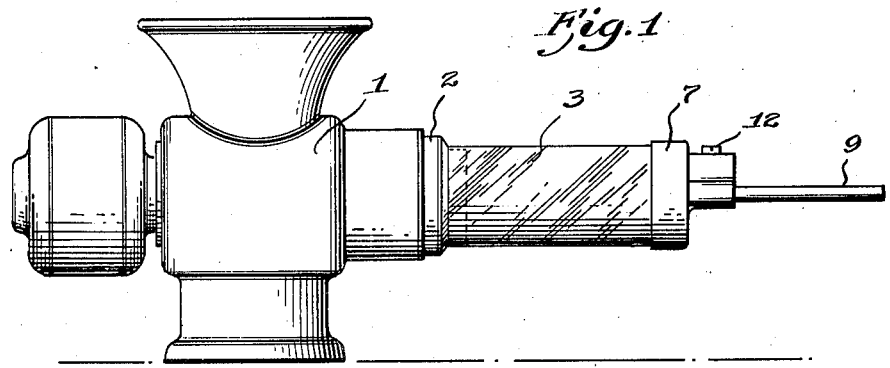
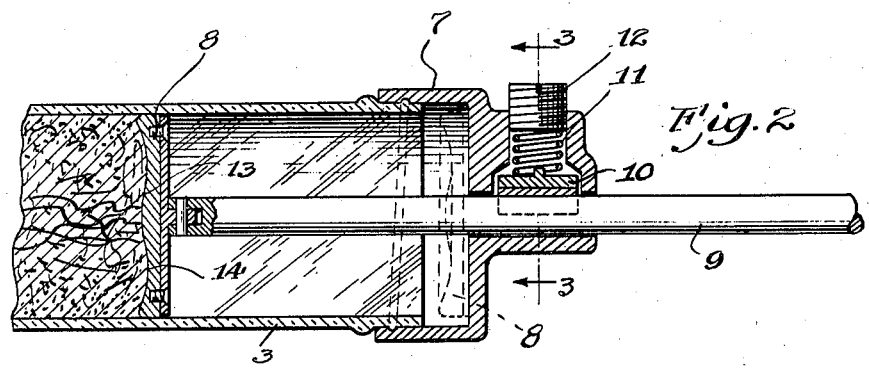
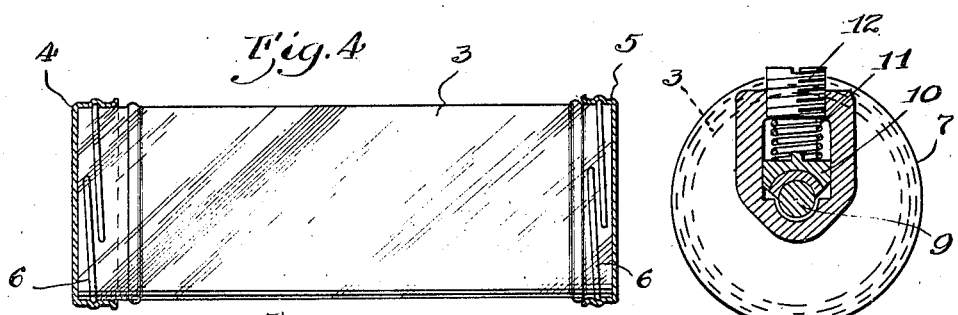
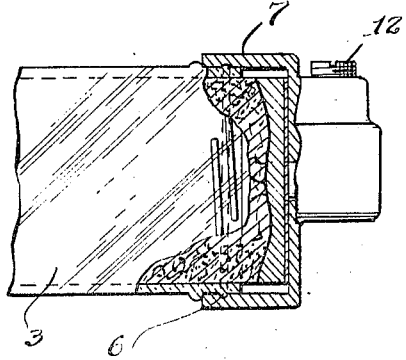
INVENTOR.
Harry S. Lee
BY
Barnes, Kisselle, Laughlin & Raisch
ATTORNEYS Feb. 23, 1943.     H. S. LEE     2,311,843
METHOD AND APPARATUS FOR HANDLING AND DISPENSING FOOD PRODUCTS
Filed May 4, 1940     5 Sheets-Sheet 2
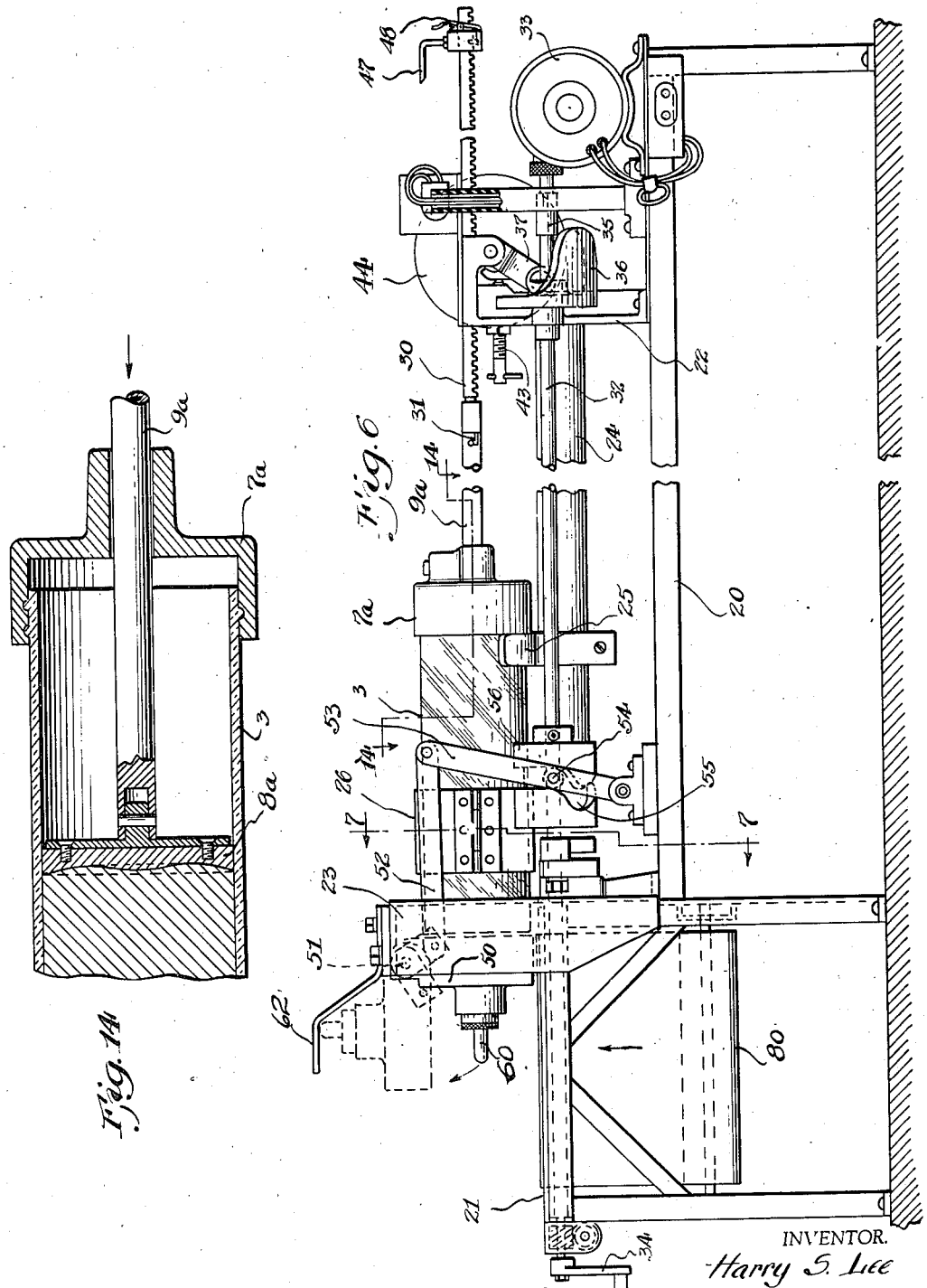
INVENTOR.
Harry S. Lee
BY
Barnes, Kisselle, Laughlin & Raisch
ATTORNEYS Feb. 23, 1943.  H. S. LEE  2,311,843
METHOD AND APPARATUS FOR HANDLING AND DISPENSING FOOD PRODUCTS
Filed May 4, 1940   5 Sheets-Sheet 3

INVENTOR.
Harry S. Lee
BY Barnes, Kisselle, Laughlin & Raisch
ATTORNEYS

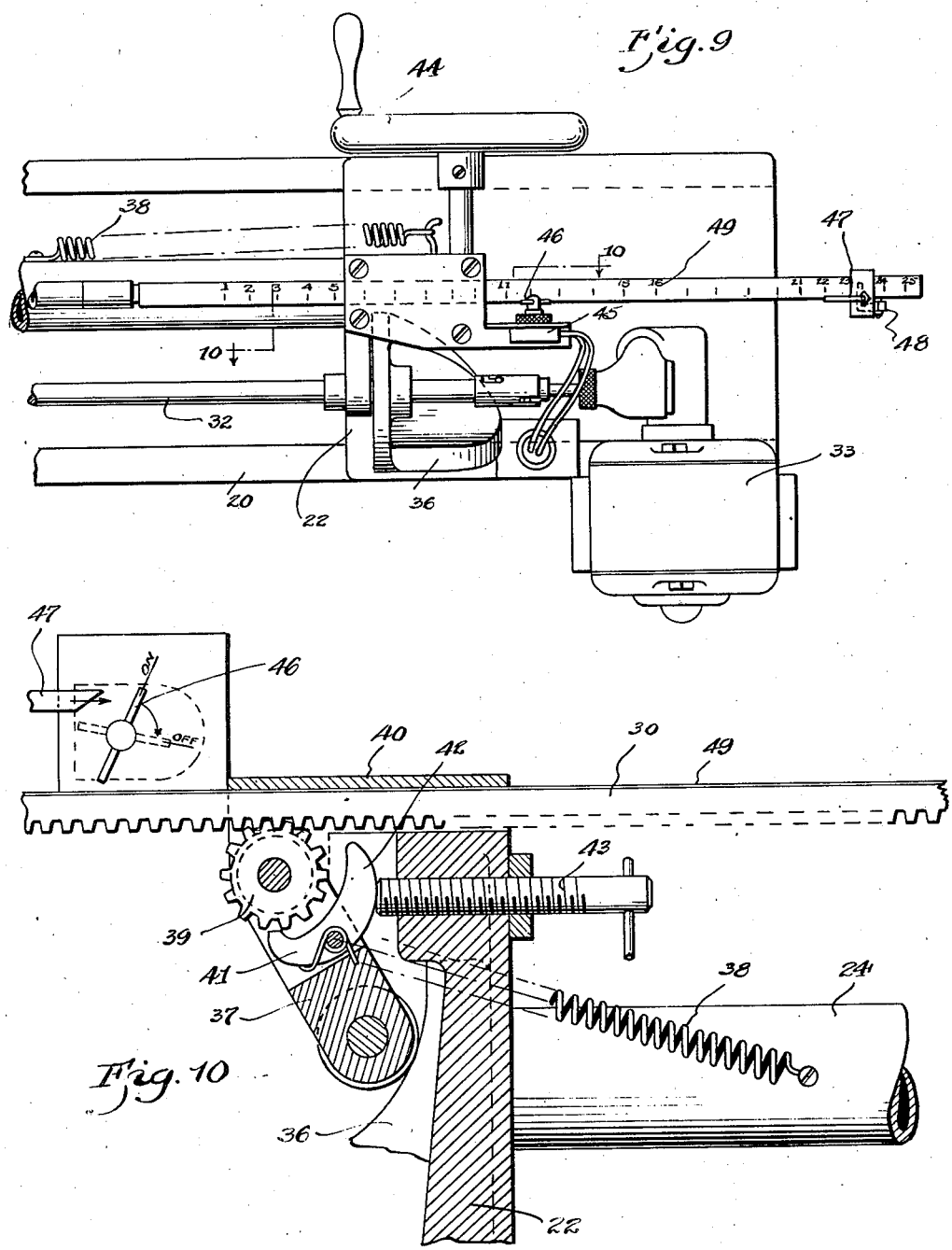

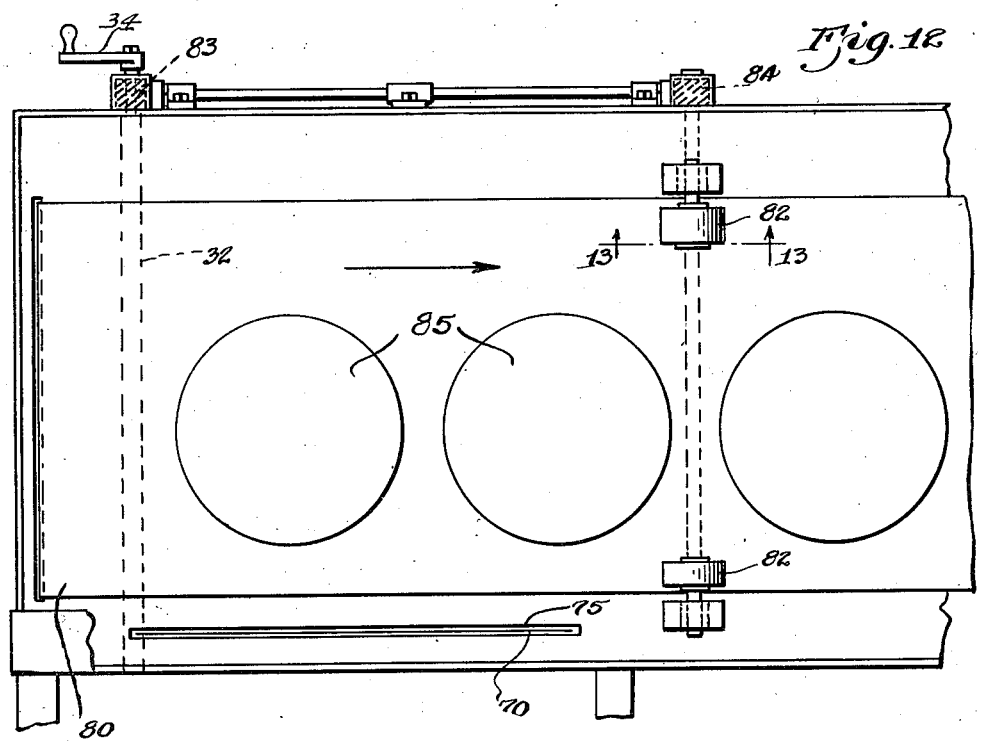
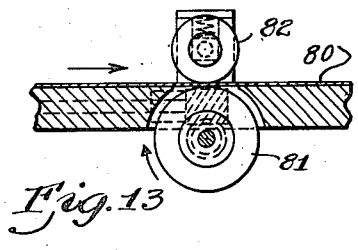
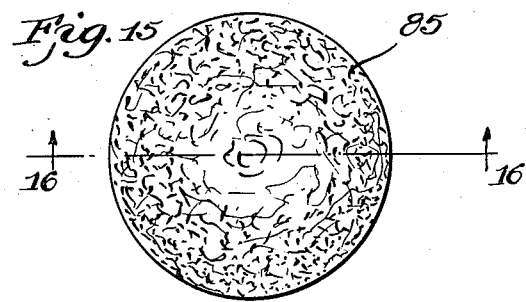
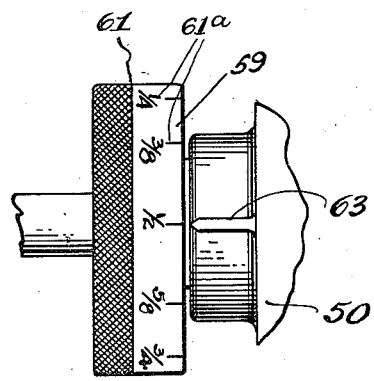
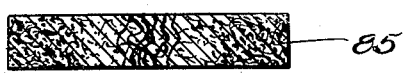

Patented Feb. 23, 1943

2,311,843

UNITED STATES PATENT OFFICE 2,311,843

METHOD AND APPARATUS FOR HANDLING AND DISPENSING FOOD PRODUCTS

Harry S. Lee, Plymouth, Mich.

Application May 4, 1940, Serial No. 333,437

9 Claims. (Cl. 17—32)

This invention relates to the preparation and dispensing of ground or plastic-like edible products such, for example, as products commonly known as sausage or hamburger, spiced meats, puddings, or sauces.

The invention is directed particularly to improvements in the preparation of and dispensing of what may be called patties; that is a geometric shape of a product which may be of disc-like formation, substantially circular in form and having a desired thickness.

Among the several objects of the invention are these: A novel manner and means of packing a bulk quantity of ground product from which the patties may be severed and including a container or open ended jar of tubular formation with separable caps for both ends. The product is packed in a container of this type and it may be temporarily stored or shipped or delivered to a retail store, from which the portions or patties may be severed as desired or ordered. It is also an object of the invention to provide a method and means for the preparation, handling and dispensing of the product in a sanitary manner, it being unnecessary at any time for the handling of the product by the hands of an operator or butcher. In this connection, a dispensing machine is provided for forming, as by a severing operation, a plurality of portions from the substance packed in the endless jar.

In regards to the dispensing apparatus, an object of the invention is to provide such an apparatus for removably receiving the jars or containers of the substance, and which, when operated, functions to eject the product from the container and to sever and dispense the patties therefrom. It is an object of the invention to provide an apparatus which can be operated by power or by hand; a still further object is to provide an apparatus which may be used as a compressing machine; still further objects include the provision of an apparatus which can be adjusted to determine the thickness of the slices dispensed from the apparatus and which embodies adjustable means for automatically dispensing a predetermined number of slices or portions.

Some products, such as meat, which contain a considerable proportion of fats, tend to adhere to surfaces, particularly of materials which have the property of relatively good heat conduction. To meet this situation the invention aims to provide certain parts, such as plungers or heads, which contact with and act upon the material, which are composed of a substance to which such material does not adhere to any material extent. The packing of the ground product in the container may be accomplished by the delivery of the substance into the container direct from a grinding machine. The grinding machine delivers the ground product adjacent the outer regions of the container, with the result that the product is not so compact in its central portion as it is in its outer regions. This is a desirable feature, and what may be called a resistance head or packing head, and acts to facilitate this action. The result is that the ultimate slice or body is relatively compact in its outer regions, but not so compact in the central region, and in fact in some instances has one or more apertures or passageways in its central part. In the cooking of such a product, such as meat, the meat shrinks somewhat, thus emphasizing or enlarging the aperture in the central portion. As a result the hot grease and fat are permitted to pass up through the central aperture so as to permeate the upper regions of the body, thus aiding in the cooking or frying of the entire body, the retention of the greater proportion of the fats and resultant increase in flavor.

The dispensing apparatus also embodies a severing knife which is so mounted and arranged that it has a shearing action which facilitates a clean severance of the patty. Other objects will be appreciated as the description progresses in conjunction with the accompanying drawings.

Fig. 1 is a view illustrating a food grinder with the container in position for receiving the ground product.

Fig. 2 is a cross sectional view illustrating a brake or resistance for aiding in packing the substance under pressure.

Fig. 3 is a view taken substantially on line 3—3 of Fig. 2.

Fig. 4 is a view of the container, with the end caps in place.

Fig. 5 is a view partially illustrating a container as filled to an excess capacity.

Fig. 6 is a side elevational view of the dispensing apparatus.

Fig. 9 is a top plan view of one end of the dispensing machine showing some of the operating mechanism and the driving motor.

Fig. 10 is an enlarged cross sectional view taken substantially on line 10—10 of Fig. 9 showing the adjustable arrangement for determining the stroke of the dispensing machine.

Fig. 11 is a view showing means for making an adjustment for the patty thickness in the dispensing head.

Fig. 12 is a plan view of one end of the machine illustrating the receiving table and wrapping paper.

Fig. 13 is a cross sectional view taken on line 13—13 of Fig. 12 showing paper controlling rollers.

Fig. 14 is a cross sectional view illustrating the piston for discharging the ground product from the container taken on line 14—14 of Fig. 6.

Fig. 15 is a plan view diagrammatically illustrating the finished product.

Fig. 16 is a cross sectional view of the product taken substantially on line 16—16 of Fig. 15.

Figure 7:
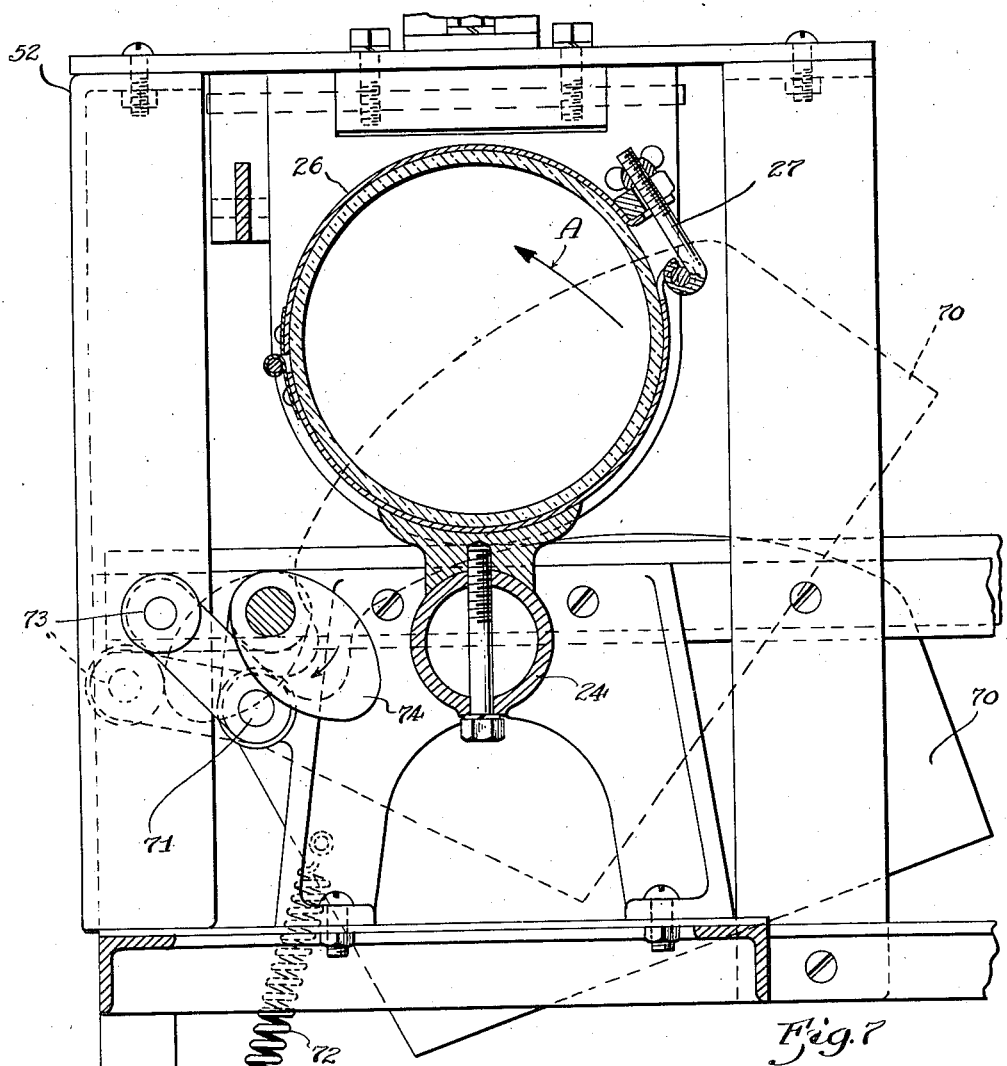
Fig. 7 is an enlarged cross sectional view taken substantially on line 7—7 of Fig. 6 showing some of the mechanism, including the severing knife.

In considering the invention in detail, it is believed to be expeditious to proceed with the first steps in preparing the product. A food grinder of any desired design is shown at 1 and it is equipped with an adaptor 2 for the reception of the endless jar or container 3. This container may be of glass or other substance, and its open ends are provided with means for the attachment of closure caps 4 and 5 preferably of the quick acting type, such for example, as the interrupted thread 6. There are other types of quick acting connecting means, but this one is believed to be suitable; for example, a bayonet slot type arrangement may be used. A suitable head 7 is placed on the other end of the container, while a piston 8 is disposed in the container having a rod 9 which projects out through the head 7. The products are forced into the container, causing the piston to retract, and the product is packed under pressure due to resistance offered to this movement. The usual feeding screw forces the products out of the grinder with force which provides the pressure when resisted. Such a screw is shown in Patent Number 1,738,933 to Strachan, dated December 10, 1929. To this end, the head 7 may be provided with a friction shoe 10 backed up by a spring 11, the tension of which may be adjusted by a screw-threaded member 12, with the result that as the ground products are discharged, the same is packed under pressure as determined by the friction. As shown in Fig. 2, the head is so formed that the piston may back into the same so that an excess volume of products may be discharged; that is to say, the products extend out through the end of the container (see Fig. 5). When the container is full or over full it may be removed from the adaptor 2 and the head 7; and before both caps 4 and 5 are secured to the container, the products are further compressed by forcing the excess (Fig. 5) back into the container by the piston 8. This may be done on any suitable pressure device, or for that matter, on the dispensing machine later to be described.

The grinding machine discharges the products so that there is a greater compression in the outer regions as indicated in Fig. 2, and the piston 8 is preferably fashioned with a central high spot 13 and an intermediate circumferential valley or low place 14 for aiding in this function.

The packaged product as shown in Fig. 4 may, of course, be prepared in a retail establishment, or it may be prepared by one who delivers the product to the retailers in the packages. In any event, the packaged product can be disposed in the dispensing machine, and the patties are formed as the contents are ejected from the container.

The dispensing apparatus is generally illustrated in Fig. 6, and it may have a suitable support including a frame 20 and a receiving platform 21. The frame 20 may include a bracket 22 near one end and a bracket or support 23 adjacent the other end with a support or strut 24 connected to the brackets. The container 3 is adapted to be placed in the machine as shown, resting in a cradle 25 and in a quick acting clamp 26 having clamping means 27. Of course, the caps 4 and 5 are removed. A head 7a, which may be similar to or identical to the head 7, or the same head for that matter, is secured to one end of the jar by the interrupted thread, and the rod 9a projects therethrough, the rod having a piston 8a. There is a rack 30 which can be quickly coupled to the end of the rod 9a, as for example by means of a bayonet type connector 31, and this rack serves to feed the piston or plunger 8a with step by step motion.

To this end there is a shaft 32, and it may be driven by power such as an electric motor 33 or by hand, as shown in Fig. 12, through the means of a crank 34 which may be attached to one end of the shaft. In order to take care of optional operation a clutch structure 35 may be employed for connecting and disconnecting the shaft from the motor. On the shaft 32 is an open cam 36 for operating a follower in the form of a pivoted arm 37 acted upon by a spring 38. On the fulcrum of the arm 37 is a small gear or pinion 39, the teeth of which mesh with those of the rack, the rack being disposed in a guide 40. Pivotally mounted on the arm is a spring pressed pawl 41 arranged to engage the pinion and having an arcuate surface 42 for engagement with an adjustable abutment 43.

When the arm 37 is on the low part of the cam it is retracted by the spring and the pawl engages the abutment, and it is swung to a position to disengage the pinion as illustrated in Fig. 10. At this time the rack is free to be moved in either direction since the pinion is free to revolve. As the cam rocks the arm 37, the pawl moves bodily with the arm and when the surface 42 moves off the abutment 43, the pawl engages the pinion, thereby locking the pinion and arm 37 for rocking movement in unison. The length of the stroke given the rack may be regulated by adjusting the stop 43. Thus while the arm has a definite swing through a given arc, only a part of the movement is effective for shifting the rack as determined by the stop 43. Mounted on the pinion shaft is a hand wheel 44 which can be turned by hand to shift the rack as desired, particularly when the pawl is free of the pinion.

A switch for controlling the circuit for the motor may be disposed to be automatically opened. To this end the switch 45 may be provided with an operator having extending arms 46 arranged to be engaged by a member 47 carried by the rack and adjustable on the rack through the means of detent means 48. The rack may advantageously be provided with a scale or indicia as indicated at 49 so that the member 47 may be adjusted in accordance with the scale for purposes which will presently appear.

A discharge head 50 is pivotally mounted as at 51 and is operated by the shaft through the means of a link 52, an arm 53 having a follower 54 positioned in the closed slot 55 of cam 56. As shown in Fig. 6, the discharge head 50 is in a position in alignment with and for substantially closing the end of the container, but on each revolution of the shaft it is swung to an open or discharge position as indicated by the dotted lines in Fig. 6. Within the discharge head or mold is a piston or plunger 57 on a slidable stem 60. The abutment 58 may be adjusted axially by turning the same to advance or retract it on its screw-threads by means of turning the enlarged part 61 thereof, which advantageously has a knurled portion for finger grip purposes, and indicia 61a (Fig. 11) for cooperation with an indicator, pointer or other means 63 on the head 50. Thus the abutment 58 may be adjusted relative to the end of the container for accommodating patties of different thicknesses, and this adjustment may be made to correspond to the amount of feeding motion given to the rack on each revolution of the shaft. When the discharge head is swung to discharge position, as indicated by the dotted lines in Fig. 6, the pin 60 strikes an overhanging abutment 62, and the piston 57 is forced axially relative to the head to discharge the product in the head. This, of course, occurs after the body has been separated from the body of substance in the container.

Figure 8:
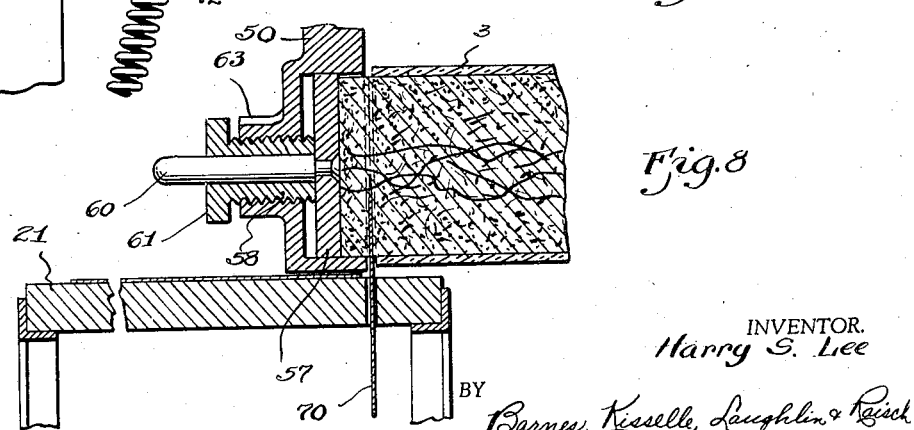
Fig. 8 is a detail sectional view illustrating the discharge cap or closure, or mold, of the dispensing machine.

A knife for severing the product is illustrated at 70 and is pivotally mounted at 71 and held out of severing position by a spring 72. Fixed to the knife is a cam follower 73 and on the shaft is an open cam 74. On each revolution of the shaft the cam engages the follower 73 and swings it and the knife, shifting the knife counter-clockwise as Fig. 7 is viewed. The knife moves through a slot 75 in the table 21 and upwardly between the end of the container and the head 50 (see Fig. 8). The edge of the knife with reference to the location of its pivot 71, is so formed that the knife has a shearing action or relative lengthwise movement as it passes through the material. This is indicated in Fig. 7 where the arrow A indicates the actual direction of motion around the pivot point 71, and the dotted line illustration of the edge of the knife shows the angular relationship.

The operation of the structure thus far described is as follows. The filled container is placed on the apparatus as shown in Fig. 6, with the head 7a coupled to the end thereof. The hand wheel 44 may be turned to advance the rack and piston to take up any slack, it being appreciated that at this time the pinion 39 is free to rotate. If the machine is to be hand operated, the handle 34 may be turned and a patty is discharged for each revolution of the shaft. The timing of the movements of the parts is such that first the cam 36 functions to shift the rack and piston 8a forwardly to shift the contents in the container so that some of the contents projects into the head. The extent of the shift will be determined by the adjustment of the stop 43. Following this, the cam 74 functions to swing the knife up through the slot between the container 3 and head 50, thus severing a portion from the body of material, and then the knife moves back to the at rest position shown in Fig. 7. Then the cam 55 functions to swing the discharge head up to the dotted line position shown in Fig. 6 and then back to its normal position, and when the pin 60 strikes the abutment 62, the piston 57 is shifted to discharge the severed portion from the discharge head or mold and it falls upon the table 21. This represents one cycle of operation and the shaft may be rotated to discharge as many severed portions as are desired. Where the device is to be used as a slicing machine for a product which has sufficient self-sustaining properties, the discharge head or mold may be dispensed with.

The arrangement provides, however, for determining beforehand how many portions are to be delivered, and this is particularly useful where the machine is operated by the motor 33. First, the operator adjusts the member 47 in accordance with the scale 49. For instance, if the reading of the scale at the beginning of the operation was 15, for example, and the member 47 is adjusted back to the mark 21, then six portions may be delivered. The motor is then set into operation by turning on the switch 45, leaving one of its arms 46 in the path of the member 47. After six portions have been delivered, the arm 47 engages and shifts the arm 46 to break the circuit for the motor and the machine automatically stops.

Various means can be provided for the reception of the separated portions, and the one shown herein involves a simple arrangement of a roll of wrapping paper 80 drawn over the receiving table and engaged between rollers 81 and 82. The rollers 81 may be driven from the shaft 32 by means of meshing gears 83 and 84, which may be of the helical type, and the portions 85 are deposited on the paper substantially in the position as illustrated in Fig. 12. With this arrangement the movement of the paper is continuous, but the movement is such that the preceding portion has advanced an adequate distance before the next one is discharged. The portions may be wrapped in the paper without being touched by the hands of the operator.

After the contents of the container have been completely discharged, the piston 8a may be quickly retracted by turning the hand wheel 44. As mentioned above, this can always be done because under normal conditions the pinion 39 is free to rotate. The head 7a may be quickly detached and a new container placed in the apparatus. In this connection, the machine may be used as a compressing device. For instance, when a container is overfilled, as shown in Fig. 5, one end may be capped and the container placed in the machine and the head 7a attached, and then by turning the hand wheel, the plunger 8a is shifted to compress and compact the material so that the cap may be placed on the container. It is desired that the substance be rather tightly packed in the containers, and in this connection some considerable pressure, and even a little time, may be necessary in order that the air may be squeezed out. Attention is also drawn to the fact that the pistons or plungers are preferably comprised of a substance which will not stick to the ground materials, and this substance is preferably fiber or a molded plastic or other similar poor heat conductor.

The finished edible portion as illustrated in Figs. 15 and 16 is of symmetrical form and the portions are substantially uniform in shape and density. The thickness can be varied by setting the machine through the means of the adjustable stop 43 and the adjustment of the plunger in the discharge head. And once the adjustment is set, the thickness will be uniform. Each portion is relatively loosely packed in its central portion, thus providing one or more openings or passages therethrough. As pointed out above, the hot greases or fats move up through the central part and thus permeate into the substance.

I claim:

1. A device substantially as described comprising, a food grinder, an adapter for the outlet, an open ended elongated container, means on the adapter and container for attaching one end of the container thereto, a head for connection to the opposite end of the container, a piston in the container having a rod extending through the head whereby ground products from the grinder are discharged into the container to shift the piston axially of the container, and means for setting up a frictional resistance to the shift of the piston for causing the ground substance to be packed into the container under pressure.

2. A device substantially as described comprising, a food grinder, an adapter for the outlet, an open ended elongated container, means on the adapter and container for attaching one end of the container thereto, a head for connection to the opposite end of the container, a piston in the container having a rod extending through the head whereby ground products from the grinder are discharged into the container to shift the piston axially of the container, and friction means in said head slidably engaging the rod to resist movement of the piston and cause the ground substance to be packed in the container under pressure.

3. A dispensing device for plastic like edible substance comprising, supporting means adapted to receive a container for the substance and which is open at both ends, a plunger for fitting into the container, a rack for shifting the plunger, a rotatably mounted pinion, the teeth of which mesh with the rack, a swinging arm mounted on the axis of the pinion, a detent on the arm engageable with the pinion to interlock the arm and pinion for movement of the rack with step by step movement, and an adjustable stop for engaging the detent and shifting it out of engagement with the pinion for regulating the stroke of the rack.

4. A dispensing device for plastic like edible substance comprising, supporting means adapted to receive a container for the substance and which is open at both ends, a plunger for fitting into the container, a rack for shifting the plunger, a rotatably mounted pinion, the teeth of which mesh with the rack, a swinging arm mounted on the axis of the pinion, a detent on the arm engageable with the pinion to interlock the arm and pinion for movement of the rack with step by step movement, an adjustable stop for engaging the detent and shifting it out of engagement with the pinion for regulating the stroke of the rack, and hand operating means for rotating the pinion when the detent is disengaged from the pinion for shifting and setting the rack and plunger.

5. A dispensing device for plastic like edible substance comprising, supporting means adapted to receive a container for the substance and which is open at both ends, a plunger for fitting into the container, a rack for shifting the plunger, a rotatably mounted pinion, the teeth of which mesh with the rack, a swinging arm mounted on the axis of the pinion, a detent on the arm engageable with the pinion to interlock the arm and pinion for movement of the rack with step by step movement, cam means for swinging the arm, and a hand operated means for rotating the pinion when the detent is disengaged therefrom for shifting and setting the rack and plunger.

6. In an apparatus for dispensing plastic like edible substance comprising, a support for the reception of an open ended container for the substance, a plunger, means including a rod connected to the plunger and extending axially therefrom, a driving motor, means operated by the motor for shifting the said means and plunger with step by step movement for ejecting successive sections of the substance from the container, means for severing and discharging the successive ejected sections, a switch for the motor, and an element adjustably positioned on the said means projecting from the plunger for engaging and operating the switch to cease operation of the motor, there being indicia for a predetermined setting of the said element for the operation of the motor to discharge a predetermined number of sections.

7. A device for forming and dispensing disc-like bodies of a plastic edible substance comprising, supporting means adapted to receive an elongated open ended container for the substance, a piston for fitting into the container, means for shifting the piston with step by step movement to eject the substance, a discharge head at the outlet end of the container for receiving disc-like portions of the ejected substance, means pivotally mounting the head, a plunger in the discharge head, means associated with the plunger and extending slidably through the head, severing means operable between the outlet end of the container and the discharge head for severing ejected portions, means for swinging the discharge head on its pivot to a position where the axis of the disc-like body is substantially vertical, and an abutment positioned to engage the said means when the discharge head is substantially in said position to shift the plunger and discharge the severed disc-like portion therefrom in a downward direction.

8. The method of forming and packaging a plastic like edible substance such as a ground meat product preparatory to the slicing of the substance into bodies or disc-like or patty form, which comprises filling an elongated container of substantially uniform cross dimensions by introducing the substance into one end of the container so that some of the substance shifts lengthwise as the container is filled, packing the substance with relatively great pressure in its outer regions and with relatively light pressure in its central zone so that the particles of the ground substance are relatively compactly disposed in the outer regions and relatively loosely disposed in the central zone for the provision of spaces in the central zone whereby each of the disc-like or patty-like bodies sliced transversely from the packed substance has a central zone relatively lightly compacted with one or more passages extending substantially therethrough.

9. The method of forming and packaging a ground meat product preparatory to the slicing of the substance into bodies of disc-like or patty form, which comprises passing meat through a grinder and from which the meat in ground form is ejected with pressure, passing the ground ejected meat from the grinder directly into one end of an elongated container of substantially uniform cross dimensions, substantially filling the container under pressure afforded by the grinder so that the body of ground meat is packed relatively compactly in its outer regions and relatively loosely in its central zone, whereby each of the disc-like or patty-like bodies sliced transversely from the packed substance has its outer regions relatively solidly compacted and a central zone relatively lightly packed with one or more passages extending substantially therethrough.

HARRY S. LEE.